United States Patent [19]

Choung et al.

[11] Patent Number: 5,157,937
[45] Date of Patent: Oct. 27, 1992

[54] ROTATING ADSORPTION HEAT PUMP USING THERMOSYPHONS FOR INTERNAL HEAT EXCHANGE

[75] Inventors: Si Y. Choung, Cheonrabook; Yoon P. Lee, Kyungki; Choon S. Lee, Seoul, all of Rep. of Korea

[73] Assignee: Korea Institute of science and Technology, Seoul, Rep. of Korea

[21] Appl. No.: 674,184

[22] Filed: Mar. 25, 1991

[30] Foreign Application Priority Data

Jan. 17, 1991 [KR] Rep. of Korea .................. 748/1991

[51] Int. Cl.$^5$ .................. F25B 15/16; F25B 17/08
[52] U.S. Cl. .................. 62/324.2; 62/478; 62/101
[58] Field of Search .................. 62/324.1, 479, 480, 62/481, 499, 513, 324.2, 101, 478; 165/104.12

[56] References Cited

U.S. PATENT DOCUMENTS

| | | | |
|---|---|---|---|
| 2,559,217 | 7/1951 | Kehoe | 62/324.2 |
| 4,169,362 | 10/1979 | Weil et al. | 62/478 |
| 4,478,057 | 10/1984 | Lotz | 62/480 |
| 4,550,712 | 11/1985 | Moravnik | 126/439 |
| 4,599,870 | 7/1986 | Hebert et al. | 62/238.6 |
| 4,660,629 | 4/1987 | Maier-Laxhuber et al. | 165/104.12 |

FOREIGN PATENT DOCUMENTS

0832270 5/1981 U.S.S.R. .................. 62/481

OTHER PUBLICATIONS

"Heat Transfer Performance of an Inclined Two Phase Clored Thermosyphen" Int. J. of Heat Transfer, vol. 26 No. 8 pp. 1207-1213 1983.

*Primary Examiner*—Albert J. Makay
*Assistant Examiner*—William C. Doerrler
*Attorney, Agent, or Firm*—Finnegan, Henderson, Farabow, Garrett & Dunner

[57] ABSTRACT

An adsorptional heat pump for using as a cooler or a heater which comprises a pair of rotary module discs and plurality of thermosyphons. The rotary module discs comprise a plurality of modules of which each of two modules are positioned in order to be opposite with each other. The thermosyphon is positioned between the two opposite modules, so that both ends thereof are respectively inserted into corresponding modules and has a good heat transferring feature, so that the thermosyphon provides an internal heat exchange between the modules. The heat pump according to the invention repeatedly and periodically carries out consequent processes such as generation. →heat exchange→adsorption→heat exchange→generation. The present invention can provide a heat pump having a promoted efficiency.

5 Claims, 6 Drawing Sheets

ROTATING ADSORPTION HEAT PUMP USING THERMOSYPHONS FOR INTERNAL HEAT EXCHANGE

BACKGROUND OF THE INVENTION

The present invention relates to an adsorptional heat pump, and more particularly to an adsorptional heat pump including a plurality of sector modules of which each module is connected to an opposite module by a thermosyphon in order to exchange heat therebetween.

Generally, conventional heat pumps are classified as one of two types, that is, an absorptional heat pump and an adsorptional heat pump. Of the two types, the adsorptional heat pump is more advantageous than the absorptional heat pump in performance thereof, such as starting performance and leakage prevention, etc.

The adsorptional heat pumps generally comprise a container containing a condenser and an evaporator, an adsorber or a generator which alternatively and repeatedly carries out an adsorption or generation of refrigerants wherein solid zeolites are used as adsorbents.

The driving principles of the adsorptional heat pumps are now described with reference to FIGS. 1A–1C.

Figure 1A:
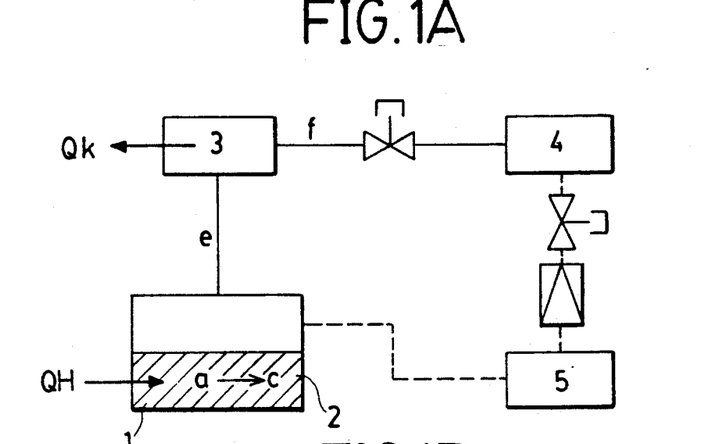
FIG. 1A is a diagram showing a generating/condensing process.
Figure 1B:
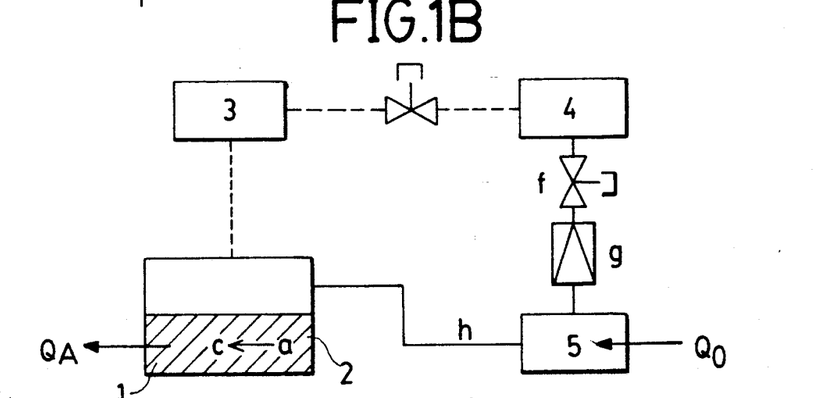
FIG. 1B is a diagram showing an adsorbing/evaporating process.
Figure 1C:
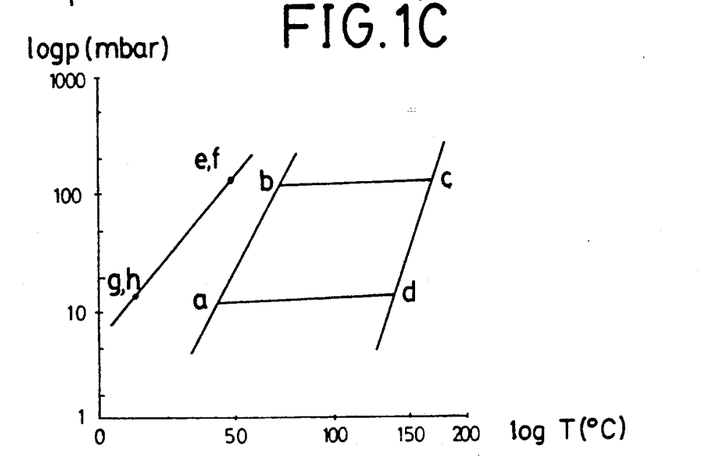
FIG. 1C is a T-P diagram showing relations between temperature and pressure at each step.

FIG. 1A describes a generating/condensing process, and then, FIG. 1B describes an adsorbing/evaporating process. FIG. 1C is a T-P diagram showing relations between temperature and pressure of each step. As shown in FIGS. 1A and 1B, the adsorptional heat pumps comprise a generator/adsorber 2 which contains solid zeolites 1 as an adsorbent therein, and alternatively and repeatedly generates and adsorbs refrigerants by using heat from an outside heat source, a condenser 3, an accumulator 4 for containing condensed refrigerants and an evaporator 5 which are connected to the generator/adsorber 2.

In the generating/condensing process (FIG. 1A), the pressure in the generator/adsorber 2 rises by a heat of generation QH, so that the refrigerants are generated. Thereafter, the generated refrigerants (vapors) are fed to the condenser 3 in which a condensation of the generated refrigerants is simultaneous with an emission of a heat of condensation $Q_K$. The heat of condensation $Q_K$ being obtained from the condenser 3 is used for heating the interior of a room in heating operation or emitted into the atmosphere in cooling operation.

Also, as shown in FIG. 1B, in the adsorbing/evaporating process, the refrigerants in the evaporator 5 are evaporated by receiving a heat of evaporation $Q_O$ from the outside, and then, the evaporated refrigerants are fed to the generator/adsorber 2 in which an adsorption of the evaporated refrigerants with the zeolites 1 is simultaneous with an emission of a heat of adsorption $Q_A$. In heating operation, the emitted heat of adsorption $Q_A$ is used for heating the interior of the room, the cooling of the interior is carried out by the evaporating process wherein the heat of evaporation $Q_O$ s received from the interior into the heat pump. Accordingly, the adsorptional heat pump alternatively and repeatedly carries out the generating/condensing process or the adsorbing/evaporating process, so that the adsorptional heat pump heats or cools the interior of the room.

However, because it is necessary for the adsorptional heat pump to repeatedly and periodically be heated or emit the heat in periodical and repeated generating-/condensing process or adsorbing/evaporating process thereof, the adsorptional heat pump has a fault that the supplying or the withdrawal of the heat happens intermittently. Therefore, the adsorptional heat pumps are not appropriate for a general cooling/heating apparatus which needs a continuous supply of the heat.

Also, in attempts to solve the above-mentioned fault, there is a conventional adsorptional heat pump in which heated heat mediums are alternatively supplied by a valve to a pair of generators/adsorbers in order to alternatively generate or adsorb the refrigerants in the generators/adsorbers. But, the heat pumps also have the problems that the control of the pumps is difficult and the supply of the heat from the pumps is intermittent because the supplying direction of the heated heat mediums must be repeatedly changed by an actuation of the valve.

In order to solve the intermittent supply of the heat from the pump and the complexity of the valve control, adsorptional heat pumps with a pair of rotary module discs are proposed as described in German Patent No. 3,342,985A1.

Figure 2A:
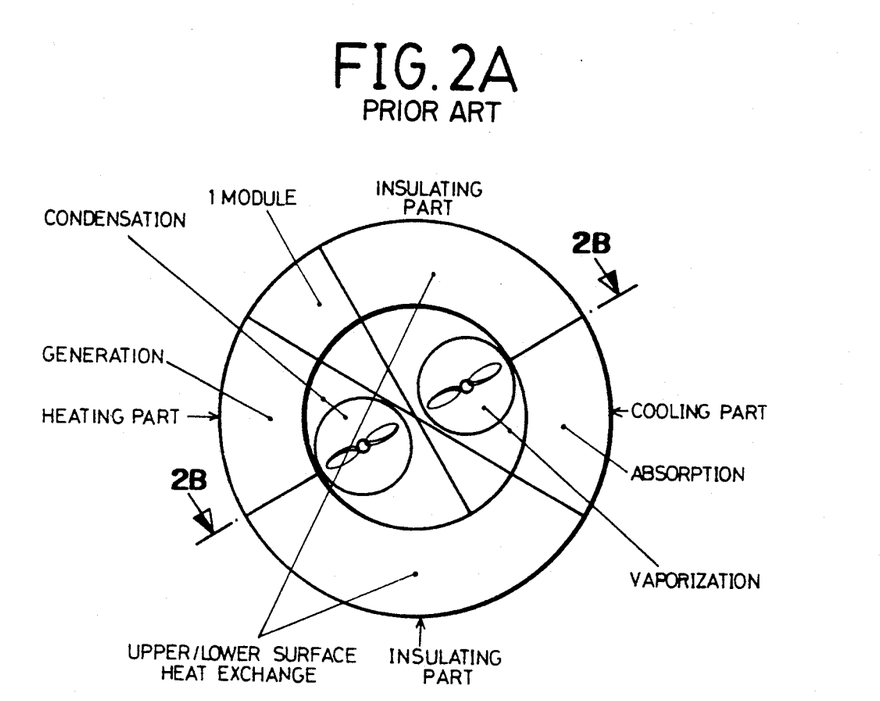
FIG. 2A is a front view of the heat pump.
Figure 2B:
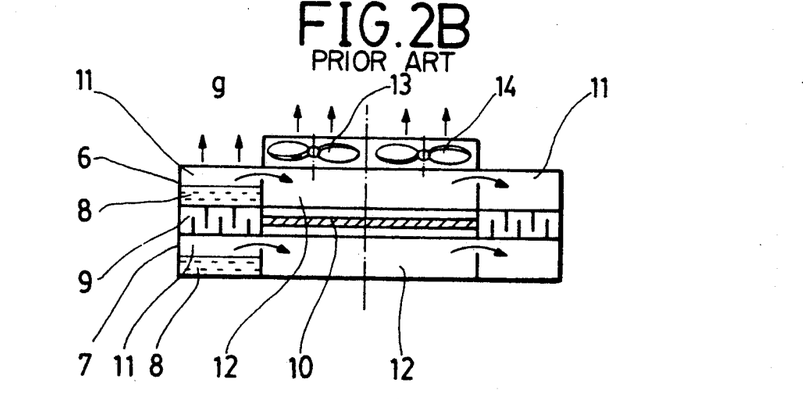
FIG. 2B is a cross-sectional view taken along the line A—A of FIG. 2A.

As described in FIGS. 2A and 2B, the above-mentioned heat pump includes upper and lower rotary module discs which rotate in opposite directions and comprise plurality of modules which are connected with each other via an internal heat exchanging means containing a heat medium such as an oil for internal heat exchange between the two opposite modules.

FIG. 2A is a front view of the rotary module discs of the adsorptional heat pump, and FIG. 2B is a cross-sectional view taken along the line A—A of FIG. 2A. As shown in FIGS. 2A and 2B each one of the rotary module discs 6,7 comprises plurality of sector modules, and contains zeolites 8 in a peripheral container thereof. Also, between the upper and lower module discs 6,7, there is an internal heat exchanging means 10 of pipe style which contains heat mediums 9 and connects each module to an opposite module.

In the adsorptional heat pumps with rotary module discs, an outside portion of each sector module functions as a generator/adsorber 11, and then, an inside portion of the sector module functions as a condenser-/evaporator 12. Therefore, according to a rotation of the rotary module discs, each sector module repeatedly acts a cyclic process comprising generation→heat exchange→adsorption→heat exchange→generation.

In FIGS. 2, numerals 13 and 14 describe a cooling fan and a blower respectively.

As described in FIG. 2B, the refrigerant in adsorption with the zeolites 8 is generated by a burnt gas (g) passing from the lower of the adsorber 11. Also, the generated refrigerants are fed to the condenser 12 in which the refrigerants are cooled and condensed by the cooling fan 13 maintaining a fixed position in spite of the rotation of the module disc.

Thereafter, a module accomplishing the generating process transfers heat to an opposite module in order to cool the interior thereof. Also, a module accomplishing the adsorbing process obtains heat, therefore, the module can reduce a quantity of the heat of generation $Q_H$ necessary in generation of the refrigerant in the consequent processes.

As above described, in the adsorptional heat pump with rotary module discs, the upper and lower discs rotate in the opposite directions and the opposite modules exchange heat with each other through the heat mediums in the heat exchanging means positioned between the two rotary module discs. Accordingly, there is an advantage of promoting COP of the heat pump because an efficiency being similar to that of heat exchange using a counter flow heat exchanger can be provided in the heat exchanging means of the heat pump.

However, there are some problems in that the use of a heat transferring feature of the heat mediums such as an oil limits heat exchanging performance, that it is difficult to seal the heat exchanging means and that the complex construction of the heat exchanging means enlarges the size of the heat pump.

SUMMARY OF THE INVENTION

Accordingly, it is an object of the present invention to provide an adsorptional heat pump with rotary module discs in which each module is connected to an opposite module via a thermosyphon of good heat transferring properties, so that, according to a rotation of the rotary module discs, an efficient internal heat exchange through the thermosyphon can be provided.

It is another object of the present invention to provide an adsorptional heat pump with rotary module discs in which the disc is generally circular, and wherein, the rotating axis thereof is positioned in a direction being perpendicular to the direction of the gravity, and also, wherein each one of the sector modules is completely sealed from the adjacent modules.

It is a further object of the present invention to provide an adsorptional heat pump with rotary module discs in which a thermosyphon having good heat transferring properties and a thermal diode depending on the inclination of the thermosyphon is positioned between each of the opposite modules in order to connect the opposite modules with each other and alternatively transfer a heat from a high temperature module to a low temperature module depending on a positional change of the high temperature module resulting from rotation of the modules, thereby, reducing the quantity of heat of generation being necessary to generate a condensed refrigerants resulting in increased efficiency of the heat pump.

With the above and such other objects in view as may hereinafter more fully appear, the invention consists of the novel constructions, combinations and arrangements of parts and assemblies described and illustrated in the accompanying drawings, but it is to be understood that changes, variations and modifications may be resorted to which fall within the scope of the invention as claimed.

BRIEF DESCRIPTION OF THE DRAWINGS

FIGS. 1A to 1C are diagrams showing the driving principles of a general adsorptional heat pumps, in which;

FIGS. 2A and 2B views showing a construction of a conventional adsorptional heat pump with rotary module discs, in which;

DETAILED DESCRIPTION OF THE PREFERRED EMBODIMENTS

Figure 3:
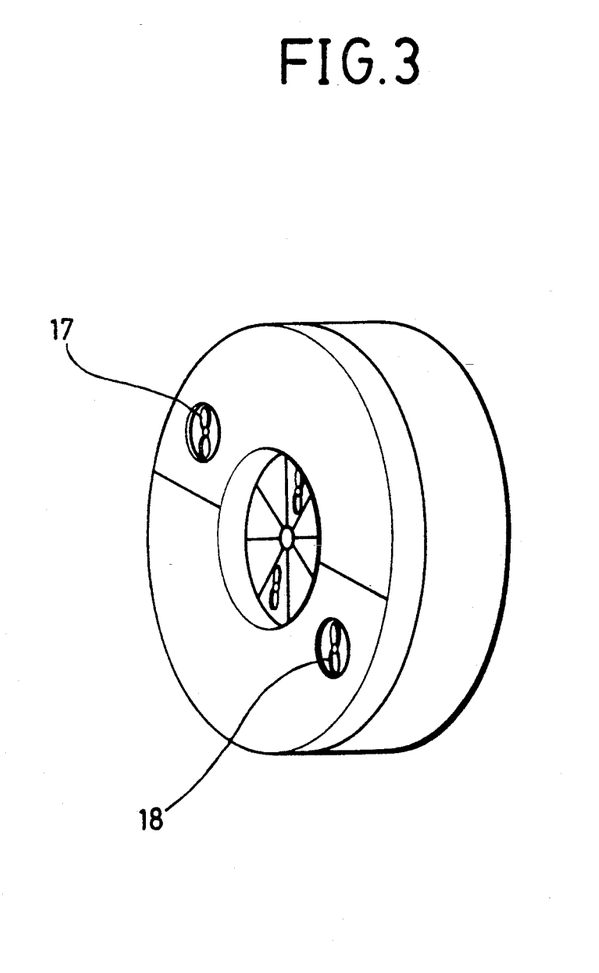
FIG. 3 is a perspective view of a heat pump in accordance with the present invention.
Figure 4:
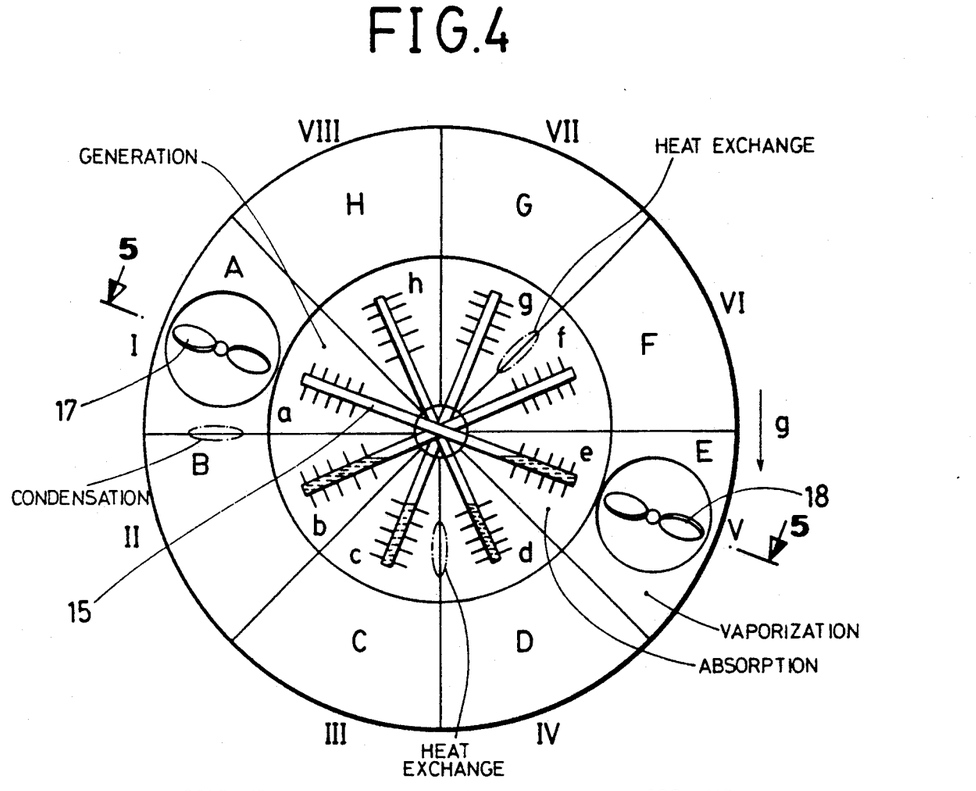
FIG. 4 is a front view of the heat pump of FIG. 3.
Figure 5:
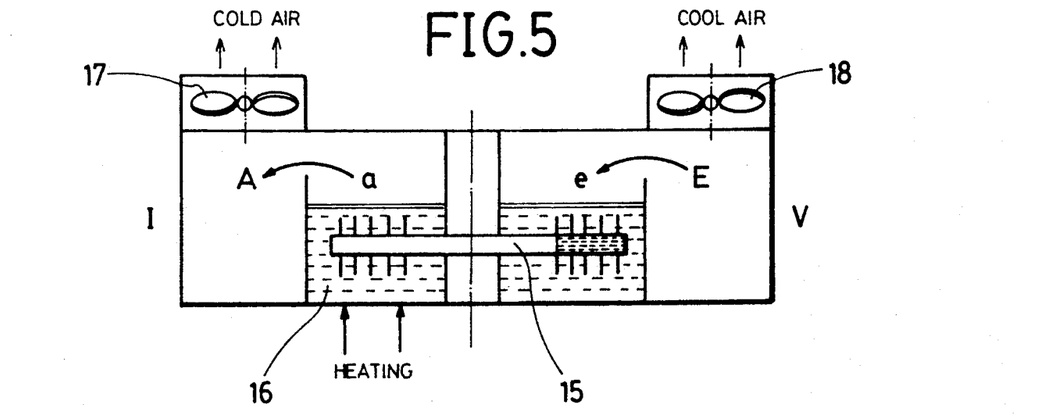
FIG. 5 is a cross-sectional view taken along the line B—B of FIG. 4.

FIGS. 3 to 5 are views showing an embodiment of the present invention in which FIG. 3 is a perspective view of a heat pump, FIG. 4 is a front view of the heat pump and FIG. 5 is a cross-sectional view taken along the line B—B of FIG. 4.

As shown in the above drawings, the heat pump in accordance with the present invention has a rotating axis being positioned in a direction being perpendicular to the direction of the gravity (g), and comprises a pair of rotary discs each one of which has eight sector modules (I-VIII) of which each module is sealed off from the adjacent modules. Also, each module is connected to an opposite module via a thermosyphon 15 of which opposing ends are positioned to be inserted into the opposite modules. The module comprises inner cells (a-h) each containing solid zeolites 16 as an adsorbent and outer cells (A-H) each having a comparatively large space. Also, there is an opening between the inner and outer cells in order to permit a movement of refrigerants therebetween.

In the drawings, numerals 17 and 18 describe a cooling fan and a blower respectively.

Also, four thermosyphons 15 of which opposing ends are inserted into the solid zeolites 16 in the opposite inner cells (a-e, b-f, c-g and d-h) of the opposite modules are maintained in position intersecting one another in each disc.

The thermosyphon 15 applied to the present invention is a kind of a two-phase closed thermosyphon which is different from a heat pipe in the following points.

That is, a heat pipe utilizes the capillarity of a wick being attached to an inner surface thereof in an operating cycle in which an evaporated gas in a heating section is condensed in a condensing section and, thereafter, returns to the heating section. Therefore, in the heat pipe, heat is usually fed from the heating section to the condensing section in spite of a positional change of the heating section. However, in the two-phase closed thermosyphon, heat is fed from a heating section to a condensing section only when the heating section is in a lower position relative to of the condensing section the direction of gravity because the condensed refrigerant returns to a heating section by the force of gravity.

Accordingly, in the two-phase closed thermosyphon, heat is not fed when the heating section is in a higher position relative to the condensing section in the direction of the gravity. In accordance with a recently published thesis, the quantity of the heat fed from the heating section of the two-phase closed thermosyphon to the condensing section thereof when the heating section is in a lower position at an inclination angle of 3° relative to a horizontal line (i.e., a line perpendicular) to the direction of gravity) is almost the same as that when the heating section is in the lowermost position (i.e., 90° angle of inclination). (Reference: "HEAT TRANSFER PERFORMANCE OF AN INCLINED TWO PHASE CLOSED THERMOSYPHON", Int. J. Heat Transfer Vol. 26. No. 8. PP1207-1213, 1983).

A cooling operation of the heat pump according to the present invention will be described with reference to FIGS. 6 and 7 as follows.

Figure 6:
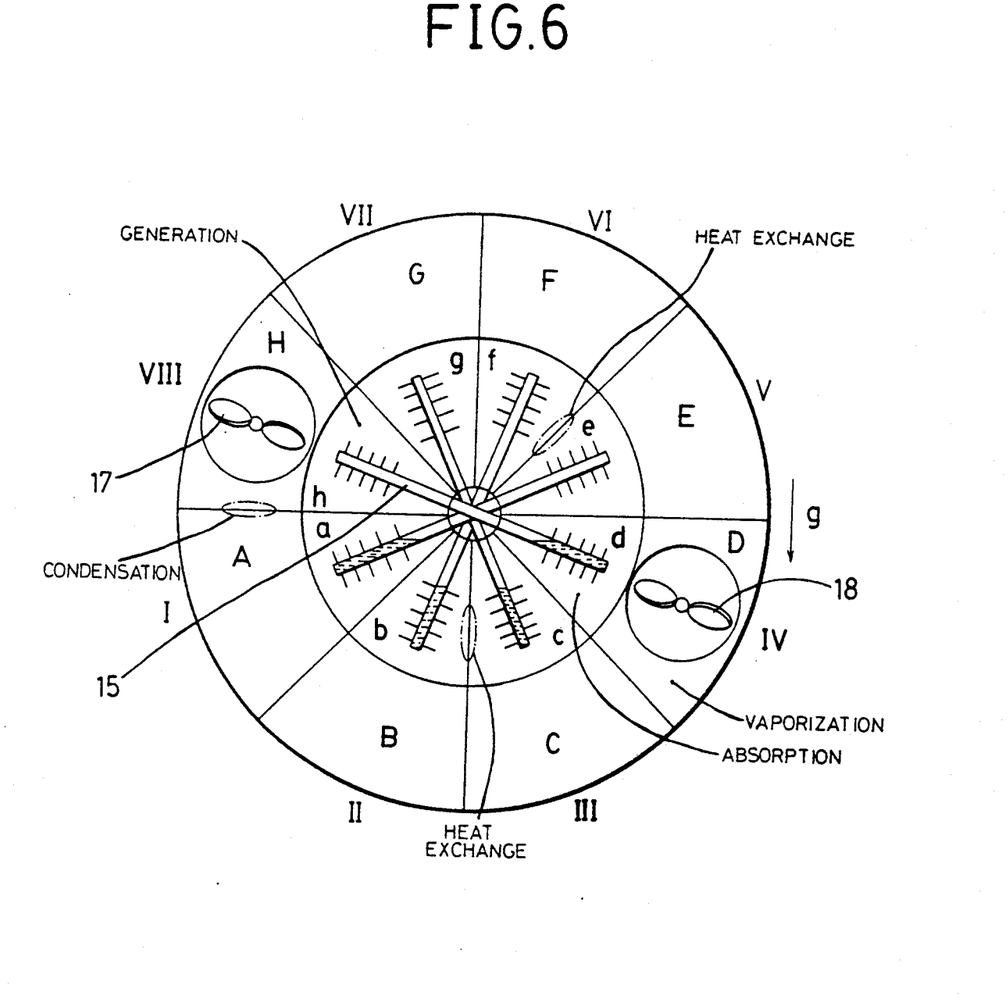
FIG. 6 is a front view of the heat pump of FIG. 4 in which the rotary module disc has been rotated in a ⅛ revolution counterclockwise.
Figure 7:
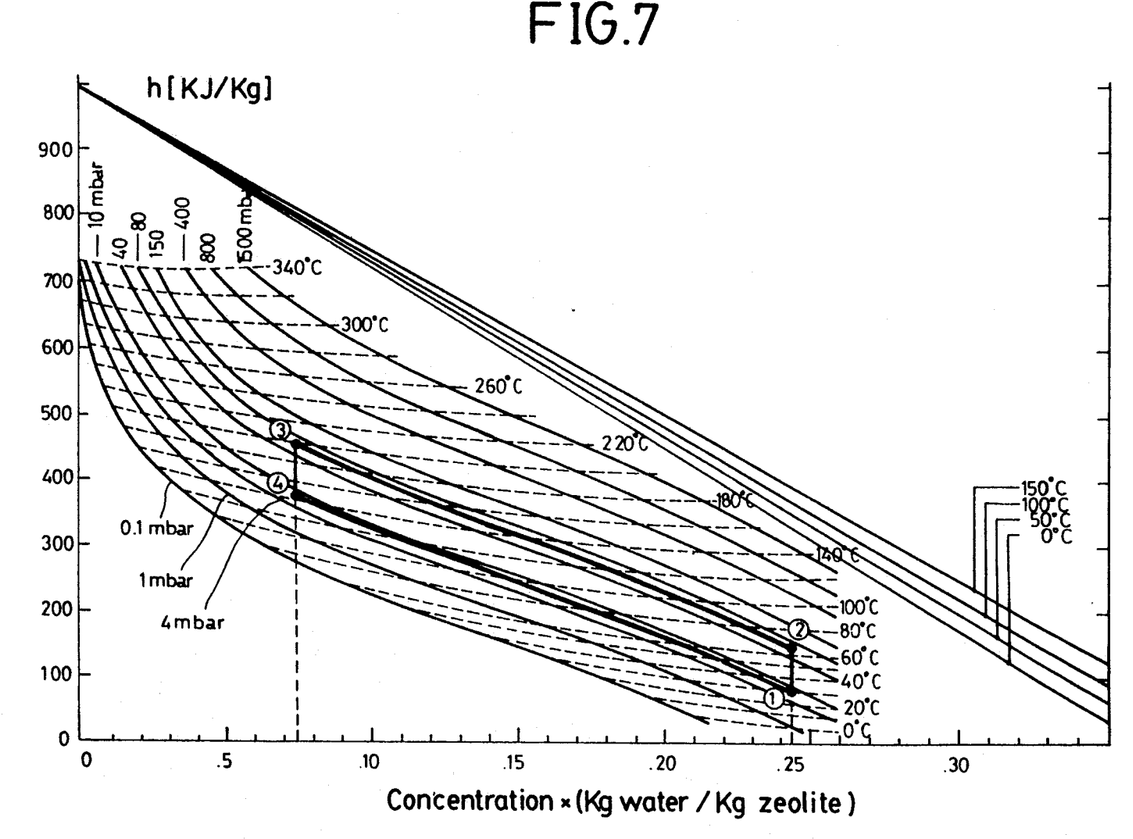
FIG. 7 is a h-x diagram of zeolites in adsorption with water.

FIG. 6 is a front view of the heat pump in which a rotary disc rotates in a ⅛ revolution. Also, FIG. 7 is a h-x diagram of the solid zeolites in adsorption with the water, wherein, x is a weight fraction of the water per the dried zeolites Kg water/Kg zeolite).

Operation and design conditions of the pumps in a cooling operation are as follows.

* adsorbents: zeolites,
* working fluid: two times distilled water,
* design condition: working fluid of 5° C. and 8.7 mbar,
* condenser: 35° C., 56.3 mbar,
* adsorber: 35° C., 8.7 mbar and x=0.243,
* generator: 200° C., 56.3 mbar and x=0.075, and
* working fluid in the thermosyphon; two times distilled water.

In operation of the pump being set with the above-mentioned conditions, at first, the eight modules (A/a to H/h) are maintained in a vacuum of 8.7 mbar by using a vacuum pump. Also, all the modules are in a condition that zeolites are in adsorption with the water as marked in of FIG. 7.

In the above condition, heat at temperatures ranging from 80° C. to 90° C. is received into the inner cell (a) of the module I in order to raise the temperature of the water in adsorption with the zeolites 16, thereby, generate the water vapor(steam). At the same time, according to the rising pressure in the inner cell (a) as marked in of FIG. 7, the steam in the inner cell moves into the outer cell (A) through the opening between the inner and outer cells as shown in FIG. 5. In the above process, the temperature of the outer cell rises without any change in pressure thereof. The process corresponds to a process step from 2 to 3 as shown in FIG. 7. Thereafter, the steam in the outer cell (A) is condensed by actuation of the cooling fan 17 which is positioned on the outer cell (A) and acts to pass an air of a lower temperature than that of the steam in the outer cell (A).

The heat of condensation from the condensing process is received into the air passing the outer cell (A) by an actuation of the cooling fan 17 and, thereafter, the heat received into the air is guided to a duct being connected to an outside of a room to be cooled, thereby, lastly emitted into said outside with the air. Also, the cooling fan 17 is usually maintained in a fixed position to the rotary disc in spite of a rotation of the disc counter-clockwise. Therefore, in rotating the disc, the sequence of the outer cells being correspondingly positioned to the fan 17 is A→H→G→F.

In accordance, when the disc rotates in a ⅛ revolution counter-clockwise from the position shown in FIG. 4, so that the module I is in a lower position on the basis of the horizontal line as shown in FIG. 6, the cooling fan 17 cools an outer cell (H) of the module VIII. Also, because heat moves from an outside heat source to the inner cell (h) of the module VIII, water in adsorption with the zeolites 16 is vaporized resulting in a steam. Thereafter, the steam in the outer cell (H) is cooled by the cooling fan 17 in order to be condensed together with a release of the heat of condensation.

Also, because the inner cell (a) of the module I being positioned under the horizontal line had been in contact with a heat source in the prior step, the inner cell (a) maintains a high temperature of about 80° C. Accordingly, heat is transferred from the inner cell (a) of the module I to the inner cell (e) of the module V through a thermosyphon 15 positioned between the two inner cells (a,e).

Such a transfer of the heat is due to the heat transferring function of the two phase closed thermosyphon as above described. Accordingly, when the heating section of the thermosyphon 15 is in a lower position of 3° on the basis of a horizontal line such as the module I of FIG. 6, heat is transferred from the heating section to the condensing section.

Thereafter, while the disc rotates, so that the module I is in a position of the module IV of FIG. 6, the module I is continuously cooled by the thermosyphon 15 together with a continuous drop of the pressure therein. This stage of the process corresponds to the process step from 3-4 in the h-x diagram of FIG. 7. In this stage there is no change in the content of water in adsorption with the zeolites 15. When the module I is in a position of the module IV in FIG. 6, the temperature and pressure of the module I are at saturated conditions of 5° C. and 8.7 mbar as shown at 4 of FIG. 7.

As shown in FIG. 4, the blower 18 is attached on outer cell (B) of the module V in order to blow an air from the room to be cooled, so that the air is blown to the outer cells of the modules aligned with the blower 18. Consequently, when the outer cell (A) of the module I is aligned with the blower 18, the water therein is evaporated by contact with the air blown from the room by the blower 18 and, thereafter, the evaporated water moves to the inner cell (a) of the module I.

At this time, a heat of evaporation is obtained from the outside of the heat pump or inside of the room to be cooled. Accordingly, the heat pump according to the present invention can cool the room to be cooled by using the above heat absorbing process. If the heat transferring capacity of the heat pump is unlimited, the temperature of the air passing the blower 18 will be about 5° C.

The steam transferred to the inner cell (a) of the module I is adsorbed by the zeolites 16 in the inner cell (a). The adsorption process corresponds to a process step from 4-1 in FIG. 7.

In the above adsorption process, heat of adsorption is generated. The heat of adsorption must be released outside of the room.

Accordingly, the operation of the heat pump in accordance with the present invention will be generally described with reference to FIG. 4 as follows.

The water in adsorption with the zeolites in the inner cell (a) of the module I is evaporated by the heat from the outside heat source (generating process). Thereafter, the evaporated water, that is, the steam, moves into the outer cell (A) wherein the steam is condensed by heat exchange with the air (condensing process). At this same time, the water in the outer cell (E) of the module V is evaporated, so that the air of the room to be cooled is cooled (evaporating process). And then, the steam from the outer cell (E) moves into the inner cell (e) wherein the steam is in adsorption with the zeolites (adsorbing process).

The inner cell (a) of the module I needs to be heated from the outside in generating process and the heat of adsorption generated in the adsorbing process in the inner cell (e) of the module V must be eliminated. Therefore, if heat is transferred between the two inner cells (a,e), there will be an adverse influence on the whole system of the heat pump.

However, in the adsorbing process of the heat pump according to the invention, the working fluid in the thermosyphon 15 is maintained in the inner cell (e) of the module V being positioned in a lower position on the basis of the horizontal line and the temperature in the inner cell (a) which is positioned in a higher position on the basis of the horizontal line is higher than the temperature in the inner cell (e), so that the thermosyphon 15 is not actuated. Also, even though there is no heat being transferred through the thermosyphon 15, there may be a little heat being transferred longitudinally through the peripheral wall of the thermosyphon 15. However, there is little time to transfer the heat because the heat pump rotates, so that the heat transferred through the peripheral wall of the thermosyphon 15 is relatively inconsequential.

Also, when the disc rotates in a ⅛ revolution from the FIG. 4 position, so that the inner cell (a) of the module I is in a lower position on the basis of the horizontal line, as shown in FIG. 6, the working fluid in the thermosyphon 15 is also positioned in the high temperature section of the inner cell (a) in order to transfer heat from the inner cell (a) to the inner cell (e).

At this time, for shifting the inner cell (a) out of the generating process stage to the adsorbing process stage, it is necessary for the temperature of inner cell (a) to decrease. Also, for shifting the inner cell (e) out of adsorbing process stage to the generating process stage, it is necessary for the temperature of the inner cell (e) to rise. However, the above two necessities for the two inner cells (a,e) are achieved by the internal heat exchange through the thermosyphon 15.

The above description is for describing an operation of the heat pump being used as a cooler. However, in using the heat pump according to the present invention as a heater, the operation of the heat pump is similar to that in using as a cooler except that the heat of generation being obtained from the condensing process in the outer cell (A) of the module I and the heat of adsorption being obtained from the adsorbing process in the inner cell (e) of the module V are used for heating the room and the heat being necessary in the evaporating process in the outer cell (E) of the module V is obtained from the outside of the room.

As above described, the heat pump in accordance with the present invention can provide an increased efficiency without any necessity to be controlled from the outside, by using rotary module discs including thermosyphons.

What is claimed is:

1. A heat pump of the adsorption type comprising;
    at least one rotary module disc which includes a disc axis and a plurality of individual, sector-shaped modules each having radially inner and outer flow-connected compartments, each of said modules having a quantity of vaporizable liquid refrigerant and also having means disposed in said inner compartment for adsorbing said refrigerant;
    a plurality f thermosyphons each of which is respectively positioned and operatively connected between diametrically opposed modules, each of said thermosyphons having opposed operative ends respectively inserted into the inner compartments of corresponding ones of said opposed modules; and
    means for rotating said rotary module disc with the disc axis being oriented substantially horizontally.

2. The heat pump as claimed in claim 1, wherein said modules are sealed off from the adjacent modules, wherein said thermosyphons are operative to transfer heat only when the corresponding module from which heat is to be transferred is in a lower position relative to a horizontal plane running through the disc axis relative to the position of the corresponding module to which heat is to be transferred.

3. The heat pump as claimed in claim 1, wherein each of said thermosyphons includes an elongated central portion disposed within said respective opposed modules and interconnecting the respective thermosyphon operative ends, and wherein each of said central portions intersectingly traverses the disc axis.

4. The heat pump as claimed in claim 1, wherein each of said thermosyphons includes heat transfer fin means connected to said respective thermosyphon operative ends.

5. The heat pump as claimed in claim 1, further comprising a pair of stationary fan means for providing axially directed air flow past successive one of said outer module compartments, said pair of fan means being disposed diametrically opposite relative to the disc axis, with one of said fan means being positioned above a horizontal plane passing through the disc axis, and with the other of said fan means being positioned below said plane.

* * * * *

UNITED STATES PATENT AND TRADEMARK OFFICE
CERTIFICATE OF CORRECTION

PATENT NO. : 5,157,937
DATED : October 27, 1992
INVENTOR(S) : SI YOUNG CHOUNG et al.

It is certified that error appears in the above-identified patent and that said Letters Patent is hereby corrected as shown below:

Claim 1, column 8, line 12, "f" should be --of--.

Claim 5, column 8, line 41, "one" should be --ones--.

Title page, item [73], Assignee: the word "science" should be --Science--.

Signed and Sealed this

Fifth Day of October, 1993

*Attest:*

BRUCE LEHMAN

*Attesting Officer*  *Commissioner of Patents and Trademarks*